(12) United States Patent
Shiroma et al.

(10) Patent No.: US 11,198,186 B2
(45) Date of Patent: Dec. 14, 2021

(54) CUTTING INSERT AND CUTTING TOOL

(71) Applicant: TUNGALOY CORPORATION, Fukushima (JP)

(72) Inventors: Hikaru Shiroma, Iwaki (JP); Satoru Yoshida, Iwaki (JP); Yuki Oikawa, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 315 days.

(21) Appl. No.: 16/412,965

(22) Filed: May 15, 2019

(65) Prior Publication Data

US 2019/0351492 A1 Nov. 21, 2019

(30) Foreign Application Priority Data

May 16, 2018 (JP) .............................. JP2018-094260

(51) Int. Cl.
*B23C 5/20* (2006.01)
*B23C 5/06* (2006.01)

(52) U.S. Cl.
CPC ................ *B23C 5/207* (2013.01); *B23C 5/06* (2013.01); *B23C 2200/0438* (2013.01); *B23C 2200/361* (2013.01); *B23C 2210/20* (2013.01)

(58) Field of Classification Search
CPC .......... B23C 5/06; B23C 5/109; B23C 5/207; B23C 5/202; B23C 5/221; B23C 5/2247; B23C 2200/0494; B23C 2200/085; B23C 2200/0433; B23C 2200/082; B23C 2200/131; B23C 2210/045; B23C 2210/0457; B23C 2210/168; B23C 5/006; B23C 2200/00; B23C 2210/00; B23C 2210/203; B23C 2210/0428;
(Continued)

(56) References Cited

U.S. PATENT DOCUMENTS 5,383,750 A 1/1995 Satran et al.
5,971,672 A 10/1999 Hansson
(Continued)

FOREIGN PATENT DOCUMENTS

EP 0372717 A2 6/1990
JP H02-190210 A 7/1990
(Continued)

*Primary Examiner* — Nicole N Ramos
(74) *Attorney, Agent, or Firm* — Studebaker & Brackett PC

(57) ABSTRACT

There is provided a cutting insert which is capable of cutting by using either one of both surfaces and is stably supported by a tool body. Each of a first end surface and a second end surface of a cutting insert includes a first inclined surface which is inclined from a diagonal line by which a corner portion connecting a first peripheral side surface and a second peripheral side surface and a corner portion connecting a third peripheral side surface and a fourth peripheral side surface are joined toward a corner portion connecting the first peripheral side surface and the fourth peripheral side surface such that a distance to an imaginary plane decreases, and a second inclined surface which is inclined from the diagonal line toward a corner portion connecting the second peripheral side surface and the third peripheral side surface such that a distance to the imaginary plane decreases.

11 Claims, 7 Drawing Sheets

(58) Field of Classification Search
CPC .............. B23C 2210/0471; B23C 5/20; B23C 2200/0455; B23C 2200/201
See application file for complete search history.

(56) References Cited

U.S. PATENT DOCUMENTS

| | | | |
|---|---|---|---|
| 8,905,683 B2 * | 12/2014 | Satran | ........................ B23C 5/08 407/48 |
| 10,022,803 B2 | 7/2018 | Yamaguchi | |
| 10,406,611 B1 * | 9/2019 | Irlin | ..................... B23C 5/2221 |
| 2004/0208713 A1 | 10/2004 | Duerr et al. | |
| 2010/0179555 A1 | 7/2010 | Ishida | |
| 2011/0097164 A1 | 4/2011 | Choi et al. | |
| 2013/0051936 A1 * | 2/2013 | Satran | ........................ B23C 5/08 407/42 |
| 2015/0117970 A1 | 4/2015 | Daub | |
| 2015/0202697 A1 * | 7/2015 | Shiota | ..................... B23C 5/109 407/42 |
| 2017/0197259 A1 * | 7/2017 | Kumoi | ..................... B23C 5/207 |
| 2017/0304911 A1 * | 10/2017 | Kumoi | ....................... B23C 5/20 |

FOREIGN PATENT DOCUMENTS

| | | |
|---|---|---|
| JP | H06-031522 A | 2/1994 |
| JP | H10-507693 A | 7/1998 |
| JP | 2004-284010 A | 10/2004 |
| JP | 2011-522712 A | 8/2011 |
| JP | 2015-519212 A | 7/2015 |
| JP | 2017-196697 A | 11/2017 |
| WO | 2008/146563 A1 | 12/2008 |
| WO | 2011/122676 A1 | 10/2011 |
| WO | 2015/163326 A1 | 10/2015 |

\* cited by examiner

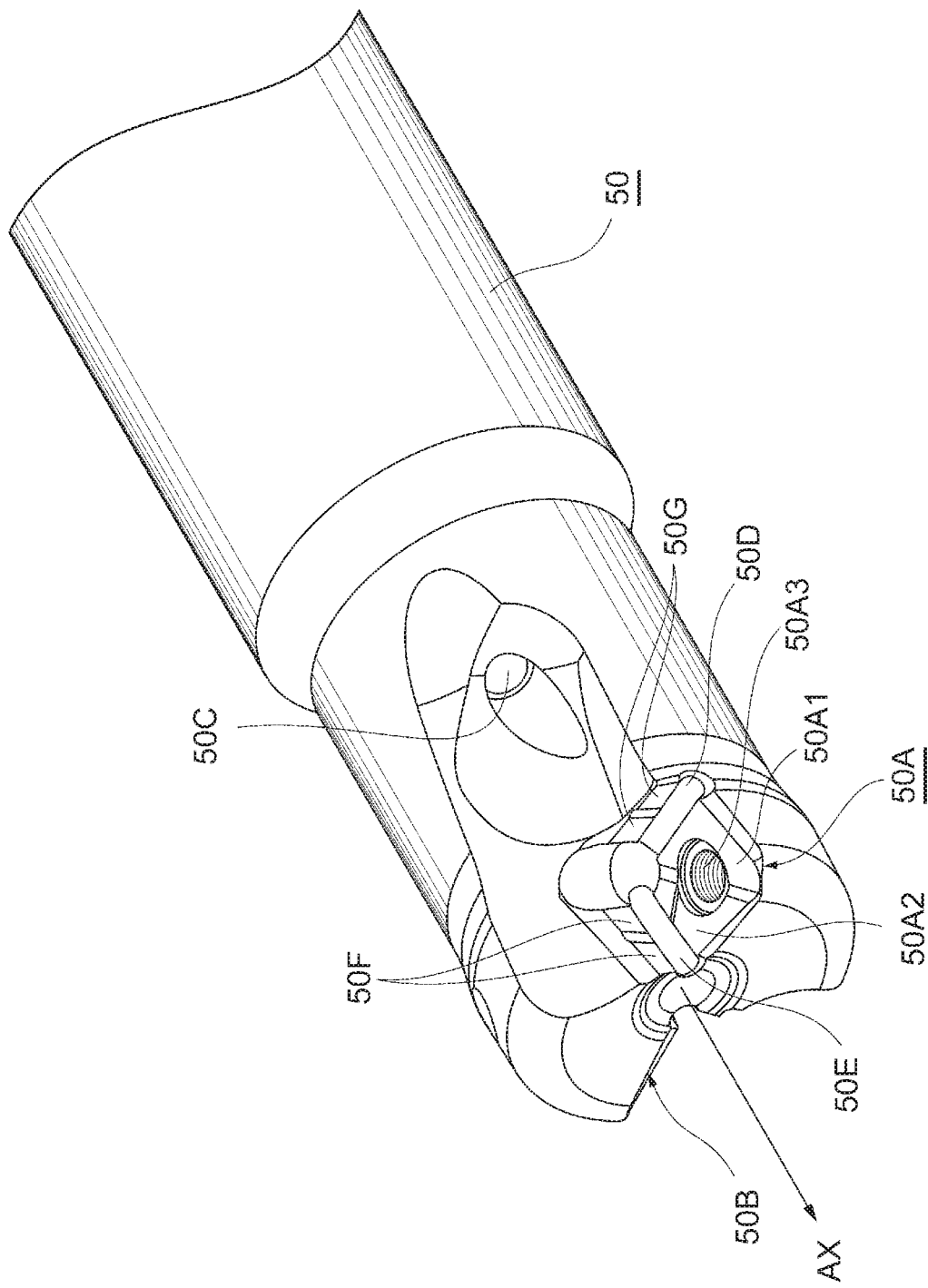

CUTTING INSERT AND CUTTING TOOL

BACKGROUND

Field

The present invention relates to a cutting insert and a cutting tool.

Description of Related Art

A cutting tool such as a milling cutter or an end mill which cuts a workpiece using a cutting insert mounted to the tip of a rotating tool body is widely known.

Japanese Translation of PCT Application No. 2015-519212 describes a cutting insert which has a large contact area with a tool body for supporting the cutting insert, and further secures a sufficient clearance angle in each of an axial direction and a radial direction.

Specifically, Japanese Translation of PCT Application No. 2015-519212 describes the cutting insert which has a substantially rhombic basic shape in plan view, is provided with equivalent cutting edges on individual sides, is reduced in thickness on a diagonal line by which two apexes corresponding to opposing corners are joined, and is gradually increased in thickness with approach to two apexes corresponding to the other opposing corners.

SUMMARY

However, in the case of the configuration described above, it is difficult to stably support the cutting insert in a direction of the diagonal line in which the cutting insert is reduced in thickness. In addition, stress is concentrated on the two apexes having large thicknesses, and hence it is difficult to have sufficient edge strength.

To cope with this, an object of the present invention is to provide a cutting insert which is stably supported by a tool body while implementing convenience that cutting can be performed by using either one of both surfaces, and is capable of achieving a sufficient axial rake angle and sufficient strength, and a cutting tool.

A cutting insert according to an aspect of the present disclosure is mounted to an end portion of a body which rotates about a rotation axis. The cutting insert includes: a first end surface and a second end surface which are capable of coming into contact with the body; a first peripheral side surface which faces an outer side in a radial direction of the rotation when the body and the second end surface come into contact with each other, and the first end surface faces toward a rotation direction; a second peripheral side surface which faces toward a tip direction of the body in a direction of the rotation axis; a third peripheral side surface which faces an inner side in the radial direction of the rotation axis; a fourth peripheral side surface which faces toward a base end direction of the body in the direction of the rotation axis; a first cutting edge which is provided in a connection portion between the first end surface and the first peripheral side surface; a second cutting edge which is provided in a connection portion between the first end surface and the second peripheral side surface; a third cutting edge which is provided in a connection portion between the second end surface and the second peripheral side surface; and a fourth cutting edge which is provided in a connection portion between the second end surface and the first peripheral side surface, a through hole which passes through the first end surface and the second end surface is formed, and the cutting insert is formed so as to be rotationally symmetrical with respect to an axis included in an imaginary plane perpendicular to a central axis of the through hole. Further, each of the first end surface and the second end surface includes a first inclined surface which is inclined from a diagonal line on the end surface by which a position of a corner portion connecting the first peripheral side surface and the second peripheral side surface in which a distance from the central axis of the through hole becomes maximum, and a position of a corner portion connecting the third peripheral side surface and the fourth peripheral side surface in which a distance from the central axis of the through hole becomes maximum are joined toward a position of a corner portion connecting the first peripheral side surface and the fourth peripheral side surface in which a distance from the central axis of the through hole becomes maximum such that a distance to the imaginary plane decreases, and a second inclined surface which is inclined from the diagonal line toward a position of a corner portion connecting the second peripheral side surface and the third peripheral side surface in which a distance from the central axis of the through hole becomes maximum such that a distance to the imaginary plane decreases, the first cutting edge includes a portion which is inclined from the corner portion connecting the first peripheral side surface and the second peripheral side surface toward the corner portion connecting the first peripheral side surface and the fourth peripheral side surface such that a distance to the imaginary plane decreases, the third cutting edge includes a portion which is inclined from the corner portion connecting the first peripheral side surface and the second peripheral side surface toward the corner portion connecting the second peripheral side surface and the third peripheral side surface such that a distance to the imaginary plane decreases, and the first inclined surface and the second inclined surface of the second end surface are brought into contact with the body when cutting is performed by using the first cutting edge and the second cutting edge. In addition, the first inclined surface and the second inclined surface of the first end surface may be brought into contact with the body when the cutting is performed by using the third cutting edge and the fourth cutting edge.

In addition, a cutting insert according to another aspect is mounted to an end portion of a body which rotates about a rotation axis. The cutting insert includes: a first end surface and a second end surface which are capable of coming into contact with the body; a first peripheral side surface which connects the first end surface and the second end surface and faces toward a first direction; a second peripheral side surface which connects the first end surface and the second end surface and faces toward a second direction; a third peripheral side surface which connects the first end surface and the second end surface and faces toward a third direction; a fourth peripheral side surface which connects the first end surface and the second end surface and faces toward a fourth direction; a first cutting edge which is provided in a connection portion between the first end surface and the first peripheral side surface; a second cutting edge which is provided in a connection portion between the first end surface and the second peripheral side surface; a third cutting edge which is provided in a connection portion between the second end surface and the second peripheral side surface; and a fourth cutting edge which is provided in a connection portion between the second end surface and the first peripheral side surface, a through hole which passes through the first end surface and the second end surface is formed, and the cutting insert is formed so as to be rotationally symmetrical with respect to an axis included in an imaginary plane perpendicular to a central axis of the through hole. Further, each of the first end surface and the second end surface includes a first inclined surface which is inclined from a diagonal line on the end surface by which a position of a corner portion connecting the first peripheral side surface and the second peripheral side surface in which a distance from the central axis of the through hole becomes maximum, and a position of a corner portion connecting the third peripheral side surface and the fourth peripheral side surface in which a distance from the central axis of the through hole becomes maximum are joined toward a position of a corner portion connecting the first peripheral side surface and the fourth peripheral side surface in which a distance from the central axis of the through hole becomes maximum such that a distance to the imaginary plane decreases, and a second inclined surface which is inclined from the diagonal line toward a position of a corner portion connecting the second peripheral side surface and the third peripheral side surface in which a distance from the central axis of the through hole becomes maximum such that a distance to the imaginary plane decreases, the first cutting edge includes a portion which is inclined from the corner portion connecting the first peripheral side surface and the second peripheral side surface toward the corner portion connecting the first peripheral side surface and the fourth peripheral side surface such that a distance to the imaginary plane decreases, the third cutting edge includes a portion which is inclined from the corner portion connecting the first peripheral side surface and the second peripheral side surface toward the corner portion connecting the second peripheral side surface and the third peripheral side surface such that a distance to the imaginary plane decreases, and the first inclined surface and the second inclined surface of the second end surface are brought into contact with the body when cutting is performed by using the first cutting edge and the second cutting edge. Further, the first inclined surface and the second inclined surface of the first end surface may be brought into contact with the body when the cutting is performed by using the third cutting edge and the fourth cutting edge.

In addition, a cutting tool according to another aspect of the present invention includes a body which rotates about a rotation axis, and a cutting insert which is mounted to an end portion of the body. The cutting insert includes: a first end surface and a second end surface which are capable of coming into contact with the body; a first peripheral side surface which faces an outer side in a radial direction of the rotation when the body and the second end surface come into contact with each other, and the first end surface faces toward a rotation direction; a second peripheral side surface which faces toward a tip direction of the body in a direction of the rotation axis; a third peripheral side surface which faces an inner side in the radial direction of the rotation axis; a fourth peripheral side surface which faces toward a base end direction of the body in the direction of the rotation axis; a first cutting edge which is provided in a connection portion between the first end surface and the first peripheral side surface; a second cutting edge which is provided in a connection portion between the first end surface and the second peripheral side surface; a third cutting edge which is provided in a connection portion between the second end surface and the second peripheral side surface; and a fourth cutting edge which is provided in a connection portion between the second end surface and the first peripheral side surface, a through hole which passes through the first end surface and the second end surface is formed, the cutting insert is formed so as to be rotationally symmetrical with respect to an axis included in an imaginary plane perpendicular to a central axis of the through hole, each of the first end surface and the second end surface includes a first inclined surface which is inclined from a diagonal line on the end surface by which a position of a corner portion connecting the first peripheral side surface and the second peripheral side surface in which a distance from the central axis of the through hole becomes maximum, and a position of a corner portion connecting the third peripheral side surface and the fourth peripheral side surface in which a distance from the central axis of the through hole becomes maximum are joined toward a position of a corner portion connecting the first peripheral side surface and the fourth peripheral side surface in which a distance from the central axis of the through hole becomes maximum such that a distance to the imaginary plane decreases, and a second inclined surface which is inclined from the diagonal line toward a position of a corner portion connecting the second peripheral side surface and the third peripheral side surface in which a distance from the central axis of the through hole becomes maximum such that a distance to the imaginary plane decreases, the first cutting edge is inclined from the connection portion between the first peripheral side surface and the second peripheral side surface toward the connection portion between the first peripheral side surface and the fourth peripheral side surface such that a distance to the imaginary plane decreases, the third cutting edge is inclined from the connection portion between the first peripheral side surface and the second peripheral side surface toward the connection portion between the second peripheral side surface and the third peripheral side surface such that a distance to the imaginary plane decreases, and the first inclined surface and the second inclined surface of the second end surface are brought into contact with the body when cutting is performed by using the first cutting edge and the second cutting edge. Further, the first inclined surface and the second inclined surface of the first end surface may be brought into contact with the body when the cutting is performed by using the third cutting edge and the fourth cutting edge.

Note that being inclined from the diagonal line by which the position of the corner portion connecting the first peripheral side surface and the second peripheral side surface in which the distance from the central axis of the through hole becomes maximum and the position of the corner portion connecting the third peripheral side surface and the fourth peripheral side surface in which the distance from the central axis of the through hole becomes maximum are joined toward the position of the corner portion connecting the first peripheral side surface and the fourth peripheral side surface or the second peripheral side surface and the third peripheral side surface in which the distance from the central axis of the through hole becomes maximum such that the distance to the imaginary plane decreases denotes that an inclined surface having the distance to the imaginary plane which decreases with approach to the connection portion away from the diagonal line is included in part of the end surface. Each contour line from the imaginary plane does not need to be identical or parallel to the diagonal line, but is preferably substantially parallel to the diagonal line. In addition, each position described above indicates only the direction of the inclination, and hence the inclined surface does not need to include the position described above. Further, as described above, it is preferable to bring the two inclined surfaces into contact with the body to support the cutting insert during machining which uses the cutting edges provided on the other end surface. The inclined surface mentioned above is preferably a flat surface from the viewpoint of production, but may also be a curved surface. In addition, the first cutting edge has the portion which is inclined from the corner portion connecting the first peripheral side surface and the second peripheral side surface toward the corner portion connecting the first peripheral side surface and the fourth peripheral side surface such that the distance to the imaginary plane decreases, and at least over half of the first cutting edge preferably has such a configuration. Similarly, the third cutting edge has the portion which is inclined from the corner portion connecting the first peripheral side surface and the second peripheral side surface toward the corner portion connecting the second peripheral side surface and the third peripheral side surface such that the distance to the imaginary plane decreases, and at least over half of the third cutting edge preferably has such a configuration.

BRIEF DESCRIPTION OF DRAWINGS

FIG. 7 is a perspective view of a tool body 50.

DETAILED DESCRIPTION

Hereinbelow, an embodiment of the present invention will be described by using the drawings. The following embodiment is shown by way of example only for explaining the present invention, and the present invention is not intended to be limited only to the embodiment.

Figure 1:
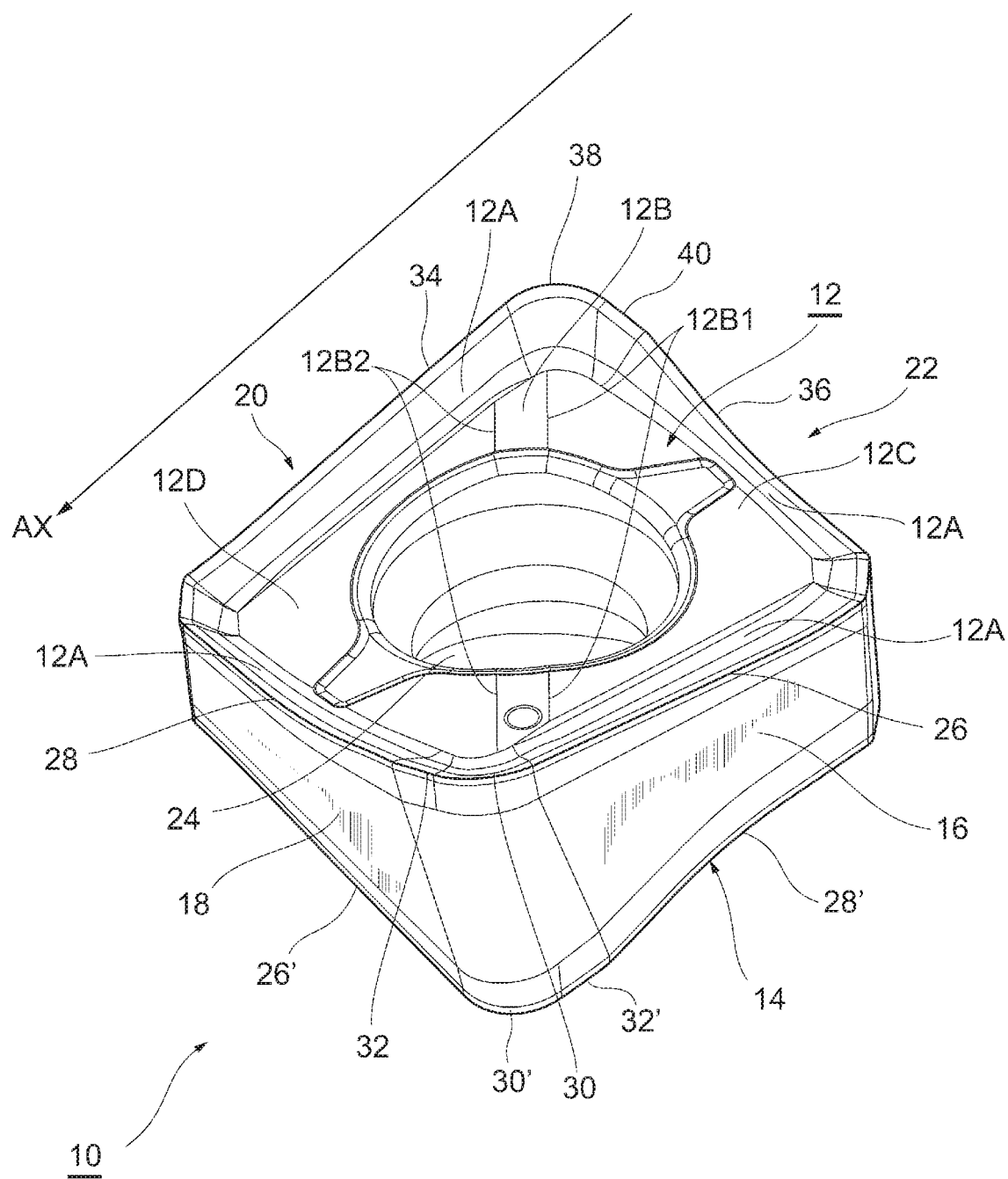
FIG. 1 is a perspective view of a cutting insert 10.
Figure 2A:
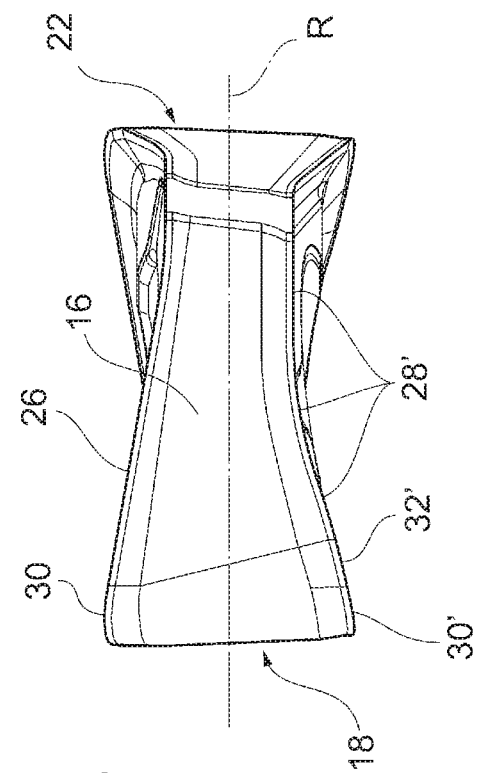
FIG. 2A is a front view of the cutting insert 10.
Figure 2B:
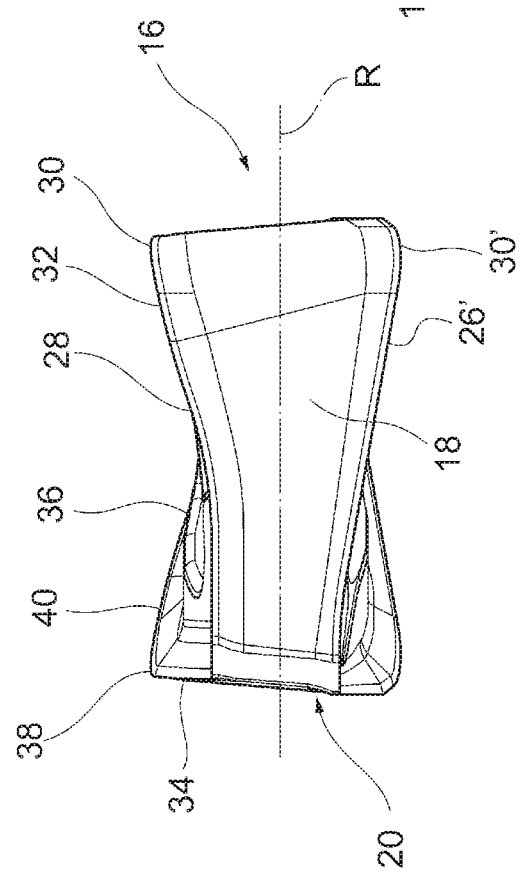
FIG. 2B is a right side view of the cutting insert 10.
Figure 3:
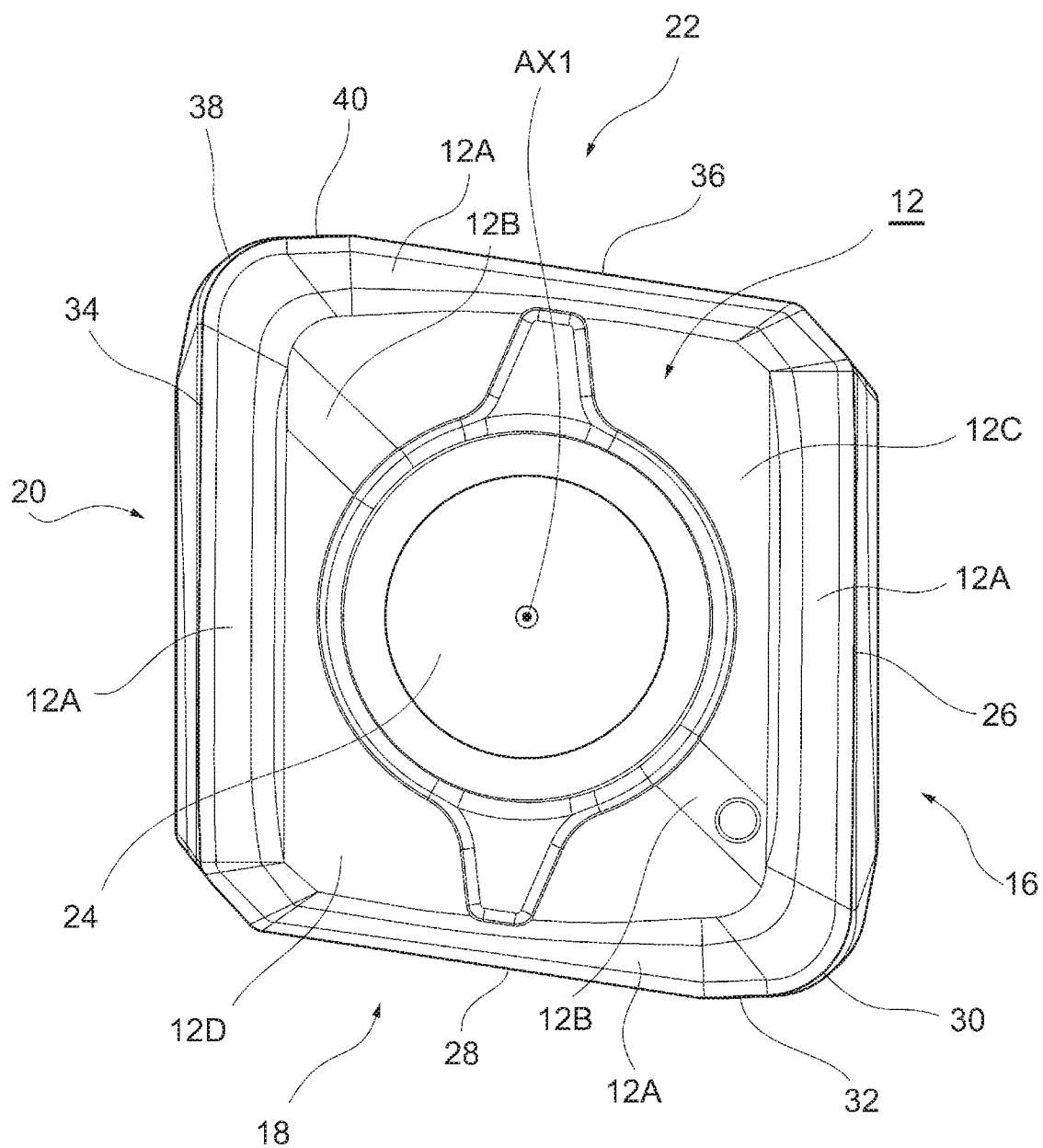
FIG. 3 is a plan view of an end mill 100.

FIG. 1 is a perspective view of a cutting insert 10 according to a first embodiment. FIG. 2A is a front view when the cutting insert 10 is viewed from a direction facing a second peripheral side surface 18, and FIG. 2B is a right side vide when the cutting insert 10 is viewed from a direction facing a first peripheral side surface 16. In addition, FIG. 3 is a plan view when the cutting insert 10 is viewed from a direction facing a first end surface 12.

When the cutting insert 10 is mounted to a tool body 50, the cutting insert 10 is mounted to the tip of the small-diameter tool body 50 (FIG. 4) having an outer diameter of, e.g., 16 mm to 50 mm which rotates about a rotation axis AX.

The cutting insert 10 includes the first end surface 12 which faces toward a rotation direction when the cutting insert 10 is mounted to the tool body 50, and a second end surface 14 which faces toward a direction opposite to the rotation direction, and comes into contact with the tool body 50. In addition, the cutting insert 10 has the first peripheral side surface 16 which connects the first end surface 12 and the second end surface 14, and faces an outer side in a radial direction with respect to the rotation axis AX when the cutting insert 10 is mounted to the tool body 50, the second peripheral side surface 18 which connects the first end surface 12 and the second end surface 14, and faces toward a tip direction of the tool body 50, a third peripheral side surface 20 which connects the first end surface 12 and the second end surface 14, faces an inner side in the radial direction with respect to the rotation axis AX, and faces the rotation axis AX, and a fourth peripheral side surface 22 which connects the first end surface 12 and the second end surface 14, and faces toward a base end direction of the tool body 50. As shown in FIG. 3, when the cutting insert 10 is viewed from the direction facing the first end surface 12 (hereinafter referred to as "end view"), the cutting insert 10 has a substantially rhombic shape. Note that adjacent peripheral side surfaces may be directly or indirectly connected to each other smoothly or via a surface having a discontinuous curvature.

As shown in the drawings, in the cutting insert 10, a through hole 24 which passes through the first end surface 12 and the second end surface 14 is formed. The cutting insert 10 is mounted to the tool body 50 by engaging a male screw 80 (FIG. 4) which extends through the through hole 24 with a female screw provided in the tool body 50 and pressing the cutting insert 10 against the tool body 50 using the head of the male screw 80.

A main cutting edge 26 (an example of a "first cutting edge") is provided in a connection portion between the first end surface 12 and the first peripheral side surface 16, and an inner cutting edge 28 (an example of a "second cutting edge") is formed in a connection portion between the first end surface and the second peripheral side surface 18. The main cutting edge 26 is formed in the most part of the connection portion between the first end surface 12 and the first peripheral side surface 16, and is linear when the main cutting edge 26 is viewed from the direction facing the first peripheral side surface 16 (FIG. 2B). As shown in this drawing, the main cutting edge 26 is formed to be inclined from a corner portion connected to the second peripheral side surface 18 toward a corner portion connected to the fourth peripheral side surface 22 so as to approach an imaginary plane R with approach to the fourth peripheral side surface 22. In the present embodiment, the inclination angle is 10 degrees (e.g., 5 degrees to 15 degrees), and the length is 4 mm (e.g., 2 mm to 10 mm). The main cutting edge 26 is the longest cutting edge formed in the cutting insert 10, and is used to cut, e.g., a wall surface or the like.

One end of the main cutting edge 26 is connected to a corner cutting edge 30 at a corner portion which connects the first peripheral side surface 16 and the second peripheral side surface 18. The corner cutting edge 30 is formed into an arc shape in end view, and has an arc having, e.g., a radius of curvature of 2.0 mm and having an interior angle of about 90 degrees. The other end of the corner cutting edge 30 is connected to one end of a flat cutting edge 32, and the other end of the flat cutting edge 32 is connected to one end of the inner cutting edge 28.

The inner cutting edge 28 is formed in the most part of the connection portion between the first end surface 12 and the second peripheral side surface 18, and is used in, e.g., ramping. In the case of a cutting tool of the present embodiment, the cutting tool can be used in the ramping of an inclination angle of up to 4 degrees. The flat cutting edge 32 has a length of about 0.6 mm, and is used to smoothly cut a bottom surface.

The cutting insert 10 is formed so as to be rotationally symmetrical by 180 degrees with respect to a central axis AX1 (FIG. 3) of the through hole 24 which passes through the central portion of the cutting insert 10 in end view. Accordingly, a main cutting edge 34 (an example of a "fifth cutting edge") is formed in a connection portion between the first end surface 12 and the third peripheral side surface 20 correspondingly to the main cutting edge 26, and an inner cutting edge 36 (an example of a "sixth cutting edge") is formed in a connection portion between the first end surface 12 and the fourth peripheral side surface 22 correspondingly to the inner cutting edge 28. In addition, a corner cutting edge 38 and a flat cutting edge 40 are formed so as to connect the main cutting edge 34 and the inner cutting edge 36. After the main cutting edge 26 or the like is worn, it is possible to perform cutting using the main cutting edge 34 or the like by rotating the cutting insert 10 about a straight line passing through the central axis AX1 of the through hole 24 by 180 degrees and mounting the cutting insert 10 to the tool body 50.

Further, the cutting insert 10 is formed so as to be rotationally symmetrical by 180 degrees with respect to a straight line which is perpendicular to the central axis AX1 of the through hole 24 and is on the imaginary plane R positioned at the midpoint position between the first end surface 12 and the second end surface 14. That is, the cutting insert 10 is provided so as to be rotationally symmetrical by 180 degrees with respect to the central axis AX1 which passes through the first end surface 12 and the second end surface 14 in end view, and is provided so as to be rotationally symmetrical by 180 degrees with respect to a diagonal line on the imaginary plane R by which opposing corner portions of the cutting insert 10 in the rhombic shape are joined, and which passes through the central axis AX1 and is perpendicular to the central axis AX1. As will be described in detail later, after the main cutting edge 26, the main cutting edge 34, and the like which are provided on the first end surface 12 are worn, it is possible to perform cutting using the cutting edges provided on the side of the second end surface 14 by rotating the cutting insert 10 about the diagonal line on the imaginary plane R which passes through a connection portion between the first peripheral side surface 16 and the second peripheral side surface 18 and a connection portion between the third peripheral side surface 20 and the fourth peripheral side surface 22 by 180 degrees and mounting the cutting insert 10 to the tool body 50.

As shown in FIG. 1, a rake face 12A which is provided along each cutting edge and includes a breaker groove is provided in a peripheral edge portion of the end surface 12. Further, in an area between the rake faces 12A and the through hole 24, in a diagonal direction in which, on the end surface 12, the position of a corner portion connecting the first peripheral side surface 16 and the second peripheral side surface 18 in which a distance from the central axis AX1 becomes maximum and the position of a corner portion connecting the third peripheral side surface 20 and the fourth peripheral side surface 22 in which the distance from the central axis AX1 becomes maximum are joined, i.e., in a direction in which the corner cutting edge 30 and the corner cutting edge 38 are joined, there are provided a belt-like top surface 12B with the through hole 24 positioned in the middle of the top surface 12B, a first inclined surface 12C which is connected to a side 12B1 of the top surface 12B and is inclined toward the position of a corner portion connecting the first peripheral side surface 16 and the fourth peripheral side surface 22 in which the distance from the central axis AX1 becomes maximum, and a second inclined surface 12D which is connected to the other side 12B2 of the top surface 12B and is inclined toward the position of a corner portion connecting the second peripheral side surface 18 and the third peripheral side surface 20 in which the distance from the central axis AX1 becomes maximum.

When the cutting insert 10 is mounted to the tool body 50, in end view, the top surface 12B is provided to have a belt-like shape which extends from the corner cutting edge 30 positioned at the tip of the tool body 50 on an outer peripheral side toward the corner cutting edge 38 positioned at a base end on an inner peripheral side, includes a diagonal line passing through the central axis AX1 of the through hole 24, and has the side 12B1 and the side 12B2 substantially parallel to the direction of the diagonal line. However, as shown in FIG. 1, in the present embodiment, the side 12B1 of the top surface 12B is not perfectly parallel to a diagonal line by which the center of the corner cutting edge 30 and the center of the corner cutting edge 38 are joined, and a part of each short side which connects the side 12B1 and the side 12B2 of the top surface 12B is connected to the rake face 12A of the corner cutting edge 30 (or the corner cutting edge 38), and the remaining part of the short side is connected to the rake face 12A of the main cutting edge 26 or the main cutting edge 34. The top surface 12B described above is a portion which does not come into contact with the tool body 50 even in the case where cutting is performed by using the cutting edges on the side of the second end surface 14. Consequently, the top surface 12B may be a flat surface or a curved surface. In addition, the top surface 12B may be omitted.

On the other hand, each of the inclined surface 12C connected to the side 12B1 of the top surface 12B and the inclined surface 12D connected to the side 12B2 thereof includes a surface which comes into contact with the tool body 50 in the case where cutting is performed by using the cutting edges on the side of the second end surface 14.

A distance between the imaginary plane R and the inclined surface 12C is maximized on the side 12B1, and is minimized in a connection portion between the first peripheral side surface 16 and the fourth peripheral side surface 22, or in the vicinity thereof. For example, the maximum distance between the imaginary plane R and the inclined surface 12C can be set to 1.5 times to 2.5 times the minimum distance. In the case where the most part of the inclined surface 12C is constituted by a flat surface, contour lines from the imaginary plane R are a plurality of line segments which are substantially parallel to the side 12B1, are disposed at regular intervals, and are shortened with approach to the connection portion. Further, in the present embodiment, when viewed from the direction facing the first peripheral side surface 16, the inclination of the inclined surface 12C is designed to substantially match the inclination of the main cutting edge 26. Accordingly, the width of the rake face 12A positioned adjacent to the main cutting edge 26 is substantially constant irrespective of the position of the main cutting edge 26 (e.g., the width of over half of the rake face 12A is 1.5 or less times the average width). Further, in a cross section perpendicular to the main cutting edge 26, a rake angle formed by the rake face 12A and the shape of the rake face 12A are also substantially constant irrespective of the position of the main cutting edge 26 (e.g., the rake angle of over half of the rake face 12A is 1.5 or less times the average rake angle).

Similarly, a distance between the imaginary plane R and the inclined surface 12D is maximized on the side 12B2 and is minimized in a connection portion between the second peripheral side surface 18 and the third peripheral side surface 20 or in the vicinity thereof, and the maximum distance between the imaginary plane R and the inclined surface 12D is set to 1.5 times to 2.5 times the minimum distance. In the case where the most part of the inclined surface 12D is constituted by a flat surface, contour lines from the imaginary plane R are a plurality of line segments which are substantially parallel to the side 12B2, are disposed at regular intervals, and are shortened with approach to the connection portion. In addition, when viewed from a direction facing the third peripheral side surface 20, the inclination of the inclined surface 12D is designed to substantially match the inclination of the main cutting edge 34, and hence the width of the rake face 12A positioned adjacent to the main cutting edge 34 is substantially constant irrespective of the position of the main cutting edge 34 (e.g., the width of over half of the rake face 12A is 1.5 or less times the average width). Further, in a cross section perpendicular to the main cutting edge 34, a rake angle formed by the rake face 12A and the shape of the rake face 12A are also substantially constant irrespective of the position of the main cutting edge 34 (e.g., the rake angle of over half of the rake face 12A is 1.5 or less times the average rake angle).

As described above, the cutting insert 10 is formed to as to be rotationally symmetrical by 180 degrees with respect to the diagonal line on the imaginary plane R which passes through the connection portion between the first peripheral side surface 16 and the second peripheral side surface 18, and the connection portion between the third peripheral side surface 20 and the fourth peripheral side surface 22. Accordingly, the first end surface 12 and the second end surface 14 have the same structure. Consequently, as shown in FIG. 1, an inner cutting edge 28' (an example of a "fourth cutting edge") having the same shape as that of the inner cutting edge 28 is provided in a connection portion between the second end surface 14 and the first peripheral side surface 16, and a main cutting edge 26' (an example of a "third cutting edge") having the same shape as that of the main cutting edge 26 is provided in a connection portion between the second end surface 14 and the second peripheral side surface 18. In addition, a corner cutting edge 30' and a flat cutting edge 32' are provided so as to connect the main cutting edge 26' and the inner cutting edge 28'. Similarly, correspondingly to the main cutting edge 34, the corner cutting edge 38, the flat cutting edge 40, and the inner cutting edge 36, cutting edges having the same structures are provided on the second end surface 14.

Thus, the cutting insert 10 according to the present embodiment has the rhombic shape, and is formed so as to be rotationally symmetrical by 180 degrees with respect to the direction in which the diagonal line by which two opposing corner portions are joined is formed. At the same time, each of two end surfaces is provided with two inclined surfaces which are inclined from the direction in which the diagonal line is formed toward the other two corner portions. The cutting insert 10 described above is mounted to the tool body 50 such that a direction from an outer peripheral side of the tip of the tool body 50 toward an inner peripheral side of the base end thereof matches the above diagonal line. According to the cutting insert 10 described above, the main cutting edge 26 is inclined such that the distance to the imaginary plane R decreases with approach to the base end of the tool body 50. Consequently, as compared with the case where the main cutting edge 26 is not inclined in the manner described above, it is easy to secure space for mounting the cutting insert to the tool body in a state in which an axial rake is positive. In addition, the inclined surface 12C is inclined along the main cutting edge 26, and hence it becomes possible to maintain the width of the breaker groove of the rake face 12A corresponding to the main cutting edge 26 at a substantially constant width along the main cutting edge 26. Accordingly, it becomes possible to prevent chips from colliding with a part of the breaker groove locally to damage the part of the breaker groove and, by extension increase the life of the tool.

Further, when the cutting insert 10 is mounted to the tool body 50, the inclined surface 12C has an inclined surface which is inclined in a direction toward an outer peripheral side of the base end from a diagonal line by which the inner peripheral side of the base end and the outer peripheral side of the tip are joined, i.e., the surface of the inclined surface 12C has an inclined surface which is further inclined in a direction opposite to the rotation direction of the tool body 50 with distance from the diagonal line. Similarly, the inclined surface 12D has an inclined surface which is inclined in a direction toward an inner peripheral side of the tip from the diagonal line, i.e., the surface of the inclined surface 12D has an inclined surface which is further inclined in the direction opposite to the rotation direction of the tool body 50 with distance from the diagonal line. Consequently, when machining is performed by using the main cutting edge 26' (an example of the "third cutting edge") on the second end surface 14, the inclined surface 12D presses the cutting insert 10 using force which acts in the direction of the normal to the inclined surface 12D, i.e., in the tip direction of the tool body 50 and in an inner diameter direction of the rotation axis AX, and the inclined surface 12C presses the cutting insert 10 using force which acts in the direction of the normal to the inclined surface 12C, i.e., in the base end direction of the tool body 50 and in an outer diameter direction of the rotation axis AX. Consequently, it becomes possible to fix and support the cutting insert 10 firmly. Note that each of the inclined surfaces does not need to be a flat surface, and may also be constituted by, e.g., a curved surface.

Further, it becomes possible to increase the thickness of the cutting insert 10 on the outer peripheral side of the tip on which a large cutting resistance acts because the cutting insert 10 on the outer peripheral side of the tip comes into contact with a workpiece first when the axial rake is positive, and hence it is possible to increase the chipping resistance of the cutting insert 10.

Further, the inclined surface 12C and the inclined surface 12D are provided so as to be kept rotationally symmetrical by 180 degrees with respect to the central axis AX1 of the through hole 24. However, the side of the second peripheral side surface 18 of the inclined surface 12D is provided so as to reach the rake face 12A connected to the first peripheral side surface 16 (connected to the corner cutting edge 30 consequently). On the other hand, the side of the third peripheral side surface 20 of the inclined surface 12D is provided so as to remain in the rake face 12A connected to the third peripheral side surface 20, and is provided so as not to reach the rake face 12A connected to the fourth peripheral side surface 22 (connected to the corner cutting edge 38 consequently). Correspondingly, the side of the fourth peripheral side surface 22 of the inclined surface 12C is provided so as to reach the rake face 12A connected to the third peripheral side surface 20 (connected to the corner cutting edge 38 consequently). On the other hand, the side of the first peripheral side surface 16 of the inclined surface 12C is provided so as to remain in the rake face 12A connected to the first peripheral side surface 16, and is provided so as not to reach the rake face 12A connected to the second peripheral side surface 18 (connected to the corner cutting edge 30 consequently). As a result, the inclined surface 12D is provided over the entire area of the main cutting edge 26' on its backside. Consequently, when machining is performed by using the main cutting edge 26' provided on the second end surface 14, it becomes possible to suitably fix and support the cutting insert 10 using the inclined surface 12D from a portion of the main cutting edge 26' which comes into contact with the workpiece first, i.e., the vicinity of a connection portion with the corner cutting edge 30' to a portion which extends in a direction of the connection portion between the second peripheral side surface 18 and the third peripheral side surface 20. The first end surface 12 and the second end surface 14 are provided symmetrically so as to have the same structure, and hence, similarly, when machining is performed by using the main cutting edge 26, it becomes possible to suitably fix and support the cutting insert 10 using the inclined surface provided over the entire area of the main cutting edge 26 on its backside.

The cutting insert 10 exerts a characteristic effect that the above-described operation is implemented by the symmetrical structure.

Next, a description will be given of the shape of the peripheral side surface of the cutting insert 10 by using FIG. 2A and FIG. 2B. As shown in the drawings, when viewed from the direction facing the second peripheral side surface 18 of the cutting insert 10 (FIG. 2A), the first peripheral side surface 16 and the imaginary plane R are not perpendicular to each other, and the first peripheral side surface 16 is inclined such that a distance to the center of the cutting insert 10 (the central axis AX1 of the through hole 24) decreases with approach to the first end surface 12, and the distance to the center of the cutting insert 10 (the central axis AX1 of the through hole 24) increases with approach to the second end surface 14.

Similarly, when viewed from the direction facing the second peripheral side surface 18 of the cutting insert 10, the third peripheral side surface 20 and the imaginary plane R are not perpendicular to each other, and the third peripheral side surface 20 is inclined such that the distance to the center of the cutting insert 10 (the central axis AX1 of the through hole 24) decreases with approach to the first end surface 12, and the distance to the center of the cutting insert 10 (the central axis AX1 of the through hole 24) increases with approach to the second end surface 14.

As a result, the first peripheral side surface 16 and the third peripheral side surface 20 are inclined such that a distance between the first peripheral side surface 16 and the third peripheral side surface 20 decreases with approach to the first end surface 12, and the distance therebetween increases with approach to the second end surface 14.

In addition, not only when viewed from the direction facing the second peripheral side surface 18 but also in a cross section which is perpendicular to the imaginary plane R and passes through the first peripheral side surface 16 or the third peripheral side surface 20, the inclination described above is provided in at least an area corresponding to over half of the cross section.

On the other hand, when viewed from the direction facing the first peripheral side surface 16 of the cutting insert 10 (FIG. 2B), the fourth peripheral side surface 22 and the imaginary plane R are not perpendicular to each other, and the fourth peripheral side surface 22 is inclined such that a distance to the center of the cutting insert 10 (the central axis AX1 of the through hole 24) increases with approach to the first end surface 12, and the distance to the center of the cutting insert 10 (the central axis AX1 of the through hole 24) decreases with approach to the second end surface 14.

Similarly, when viewed from the direction facing the first peripheral side surface 16 of the cutting insert 10, the second peripheral side surface 18 and the imaginary plane R are not perpendicular to each other, and the second peripheral side surface 18 is inclined such that a distance to the center of the cutting insert 10 (the central axis AX1 of the through hole 24) increases with approach to the first end surface 12, and the distance to the center of the cutting insert 10 (the central axis AX1 of the through hole 24) decreases with approach to the second end surface 14.

As a result, the fourth peripheral side surface 22 and the second peripheral side surface 18 are inclined such that a distance between the fourth peripheral side surface 22 and the second peripheral side surface 18 increases with approach to the first end surface 12, and the distance therebetween decreases with approach to the second end surface 14.

In addition, not only when viewed from the direction facing the first peripheral side surface 16 but also in a cross section which is perpendicular to the imaginary plane R and passes through the fourth peripheral side surface 22 or the second peripheral side surface 18, the inclination described above is provided in at least an area corresponding to over half of the cross section.

As will be described later in detail, by having the configuration described above, it is possible to provide the cutting insert 10 which can be mounted to the tool body 50 such that the edge strength of the main cutting edge is improved by increasing a cross-sectional area subjected to a cutting force which is applied when cutting is performed by using the main cutting edge while symmetry between the side of the first end surface 12 and the side of the second end surface 14 is maintained, and the strength of the cutting edge is increased by having a positive axial rake and further setting a radial rake to a negative or small positive angle while securing a proper clearance angle.

Figure 4:
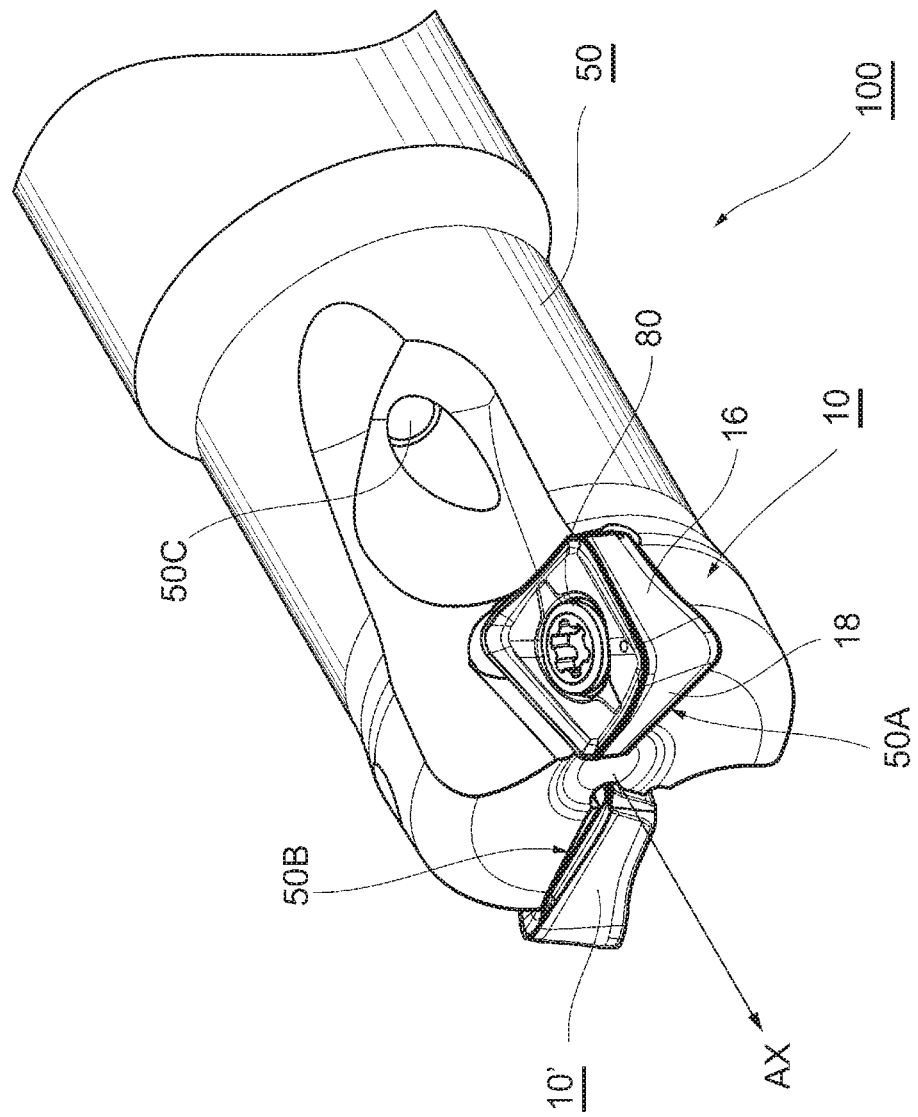
FIG. 4 is a perspective view of a tip portion of the end mill 100.
Figure 5:
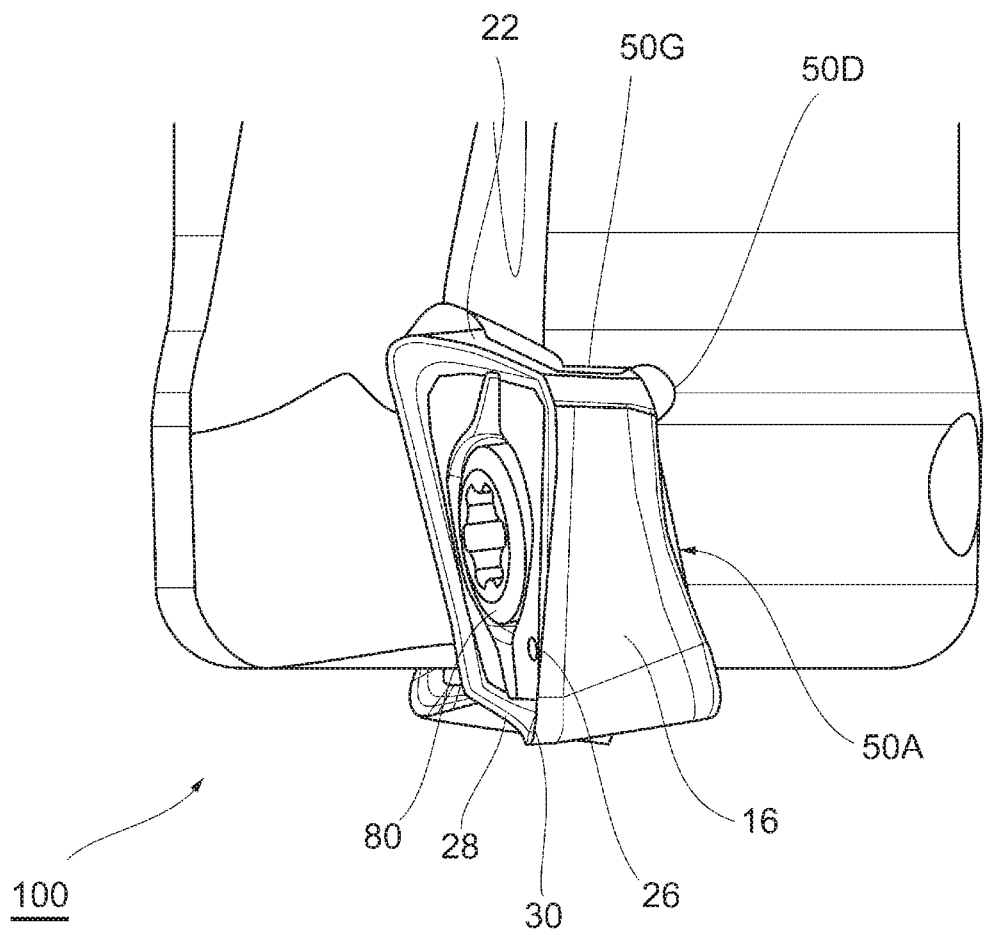
FIG. 5 is an enlarged view when the end mill 100 is viewed from a direction perpendicular to a rotation axis AX.
Figure 6:
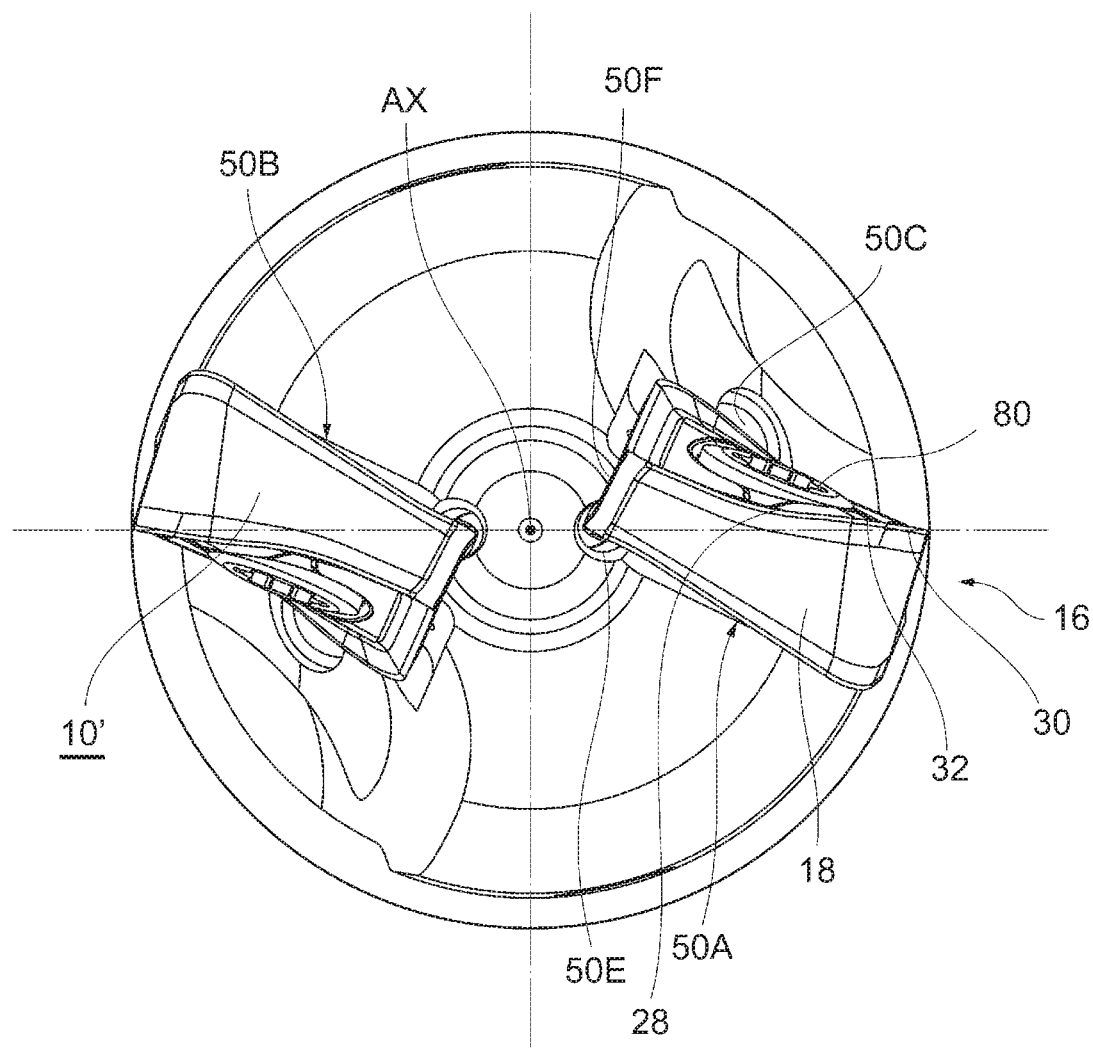
FIG. 6 is a tip view when the end mill 100 is viewed from a direction of the rotation axis AX.

FIG. 4 is a perspective view of a tip portion of an end mill 100 (an example of a "cutting tool") in which the cutting insert 10 and a cutting insert 10' which is identical to the cutting insert 10 are mounted to the tool body 50. FIG. 5 is an enlarged view of the vicinity of the cutting insert 10 when the end mill 100 is viewed from a direction perpendicular to the rotation axis AX. FIG. 6 is a tip view when the end mill 100 is viewed from a direction of the rotation axis AX.

As shown in FIG. 4, the tool body 50 has a cylindrical shape which is long in the direction of the rotation axis AX, and can rotate about the rotation axis AX.

FIG. 7 is a perspective view of the tool body 50 in a state in which the cutting insert 10 is not mounted. At the tip of the tool body 50, an insert mounting portion 50A and an insert mounting portion 50B are provided so as to be spaced apart from each other by 180 degrees in a circumferential direction and be rotationally symmetrical by 180 degrees with respect to the rotation axis AX. The cutting insert 10 is mounted to the insert mounting portion 50A, and the cutting insert 10' is mounted to the insert mounting portion 50B.

In order to allow contact of the inclined surface 12C and the inclined surface 12D of the cutting insert 10, on an insert seat bottom surface facing toward a rotation direction of the insert mounting portion 50A, there are provided an inclined surface 50A2 which is inclined upwardly from the diagonal line by which the outer peripheral side of the tip and the inner peripheral side of the base end are joined such that a distance to the imaginary plane R decreases with approach to the inner peripheral side of the tip on which the connection portion between the first peripheral side surface 16 and the fourth peripheral side surface 22 is positioned, and an inclined surface 50A1 which is inclined upwardly such that the distance to the imaginary plane R decreases with approach to the outer peripheral side of the base end on which the connection portion between the second peripheral side surface 18 and the third peripheral side surface 20 is positioned. The inclined surface 50A2 and the inclined surface 50A1 are inclined at the same inclination angles as those of the inclined surface 12C and the inclined surface 12D. Note that these inclined surfaces are formed to be smaller than the inclined surface 12C and the inclined surface 12D so as not to interfere with the rake faces 12A and each cutting edge. In addition, in a gap between the inclined surface 50A1 and the inclined surface 50A2, a concave surface which is spaced from and faces the top surface 12B is formed.

In addition, between the two inclined surfaces 50A1 and 50A2 on the insert seat bottom surface, a female screw 50A3 which substantially has the rotation direction as an axis is provided.

Further, as shown in FIG. 5 and FIG. 7, a wall portion 50G which faces toward the direction of the rotation axis AX serving as the tip direction of the tool body 50 is provided substantially perpendicularly to the insert seat bottom surface. The wall portion 50G is formed so as to come into contact with the fourth peripheral side surface 22. Further, at a boundary between the wall portion 50G and the insert seat bottom surface, a clearance 50D is provided so that the tool body 50 is bored.

In addition, as shown in FIG. 6 and FIG. 7, the insert mounting portion 50A is provided with a wall portion 50F which faces the outer diameter direction and forms a slightly acute angle with the insert seat bottom surface. Further, at a boundary between the insert seat bottom surface and the wall portion 50F of the insert mounting portion 50A, a clearance 50E is provided so that the tool body 50 is bored. The wall portion 50F is formed to be able to come into contact with the third peripheral side surface 20.

Note that, as shown in FIG. 4, on the base end side of the tool body 50 which is opposite to the side of the insert mounting portion 50A, a through hole 50C for supplying coolant extends in the direction of the rotation axis AX.

The cutting insert 10 is mounted to the insert mounting portion 50A described above. Specifically, in a state in which the male screw 80 extends through the through hole 24 of the cutting insert 10, the male screw 80 is engaged with the female screw provided in the insert seat bottom surface, the cutting insert 10 is pressed against the tool body 50 by using the head of the male screw 80, and the cutting insert 10 is thereby mounted to the tool body 50.

At this point, two inclined surfaces corresponding to the two inclined surfaces 12C and 12D provided on the side of the second end surface 14 come into contact with part of two inclined surfaces which are provided on the insert seat bottom surface correspondingly to the two inclined surfaces.

In addition, as shown in FIG. 5, the fourth peripheral side surface 22 comes into contact with the wall portion 50G. In addition, the main cutting edge provided in a connection portion between the second end surface 14 and the fourth peripheral side surface 22 is accommodated in a hollow portion which is the clearance 50D. In addition, as shown in FIG. 5, the corner cutting edge 30 and the inner cutting edge 28 slightly protrude from the tip of the tool body 50 in the direction of the rotation axis AX. In the present embodiment, an axial rake angle (axial rake) at this point is positive (e.g., about 4 degrees).

Further, as shown in FIG. 6, the third peripheral side surface 20 comes into contact with the wall portion 50F. In addition, the inner cutting edge provided in a connection portion between the second end surface 14 and the third peripheral side surface 20 is accommodated a hollow portion which is the clearance 50E. Further, as shown in FIG. 6, the corner cutting edge 30 and the main cutting edge 26 connected to the corner cutting edge 30 slightly protrude from the insert seat bottom surface of the insert mounting portion 50A in the outer diameter direction. In the present embodiment, a radial rake angle (radial rake) at this point is negative. Note that the axial rake and the radial rake are not limited thereto.

Similarly to the cutting insert 10, the cutting insert 10' having the same structure as that of the cutting insert 10 is mounted to the insert mounting portion 50B having the same structure as that of the insert mounting portion 50A.

It is possible to cut the workpiece by rotating the tool body 50 about the rotation axis AX while cooling the cutting insert 10 and the cutting insert 10' by supplying the coolant from each of the through hole 50C and a through hole provided on the side of the insert mounting portion 50B.

The cutting insert 10 described above has the rhombic shape in end view and is provided so as to be rotationally symmetrical by 180 degrees with respect to the central axis AX1 which passes through the first end surface 12 and the second end surface 14 in end view, and hence the cutting edge is formed in the portion which connects the first end surface 12 and the first peripheral side surface 16, and the equivalent cutting edge is formed in the portion which connects the first end surface 12 and the third peripheral side surface 20. Further, the cutting insert is provided so as to be rotationally symmetrical by 180 degrees with respect to the direction of the diagonal line of the cutting insert 10 in the rhombic shape on the imaginary plane R which passes through the midpoint position between the first end surface 12 and the second end surface 14, i.e., the diagonal line by which the portion which connects the first peripheral side surface 16 and the second peripheral side surface 18 and the portion which connects the third peripheral side surface 20 and the fourth peripheral side surface 22 are joined, and which passes through the central axis AX1, and is perpendicular to the central axis AX1, and hence the cutting edge equivalent to the cutting edge formed in the portion which connects the first end surface 12 and the first peripheral side surface 16 is formed in each of the portion which connects the second end surface 14 and the second peripheral side surface 18 and the portion which connects the second end surface 14 and the fourth peripheral side surface 22. Consequently, cuttings in 4 patterns are allowed by using one cutting insert 10.

Further, in the cutting insert 10, each of the first end surface 12 and the second end surface 14 has two inclined surfaces which have large thicknesses in the above-described diagonal line, and are inclined toward two corner portions constituting the other diagonal line, i.e., are inclined such that distances to the imaginary plane R decrease. It becomes possible to fix the cutting insert 10 by using the two inclined surfaces on the second end surface 14 when cutting is performed by using the cutting edges on the side of the first end surface 12, and fix the cutting insert 10 by using the two inclined surfaces on the first end surface 12 when cutting is performed by using the cutting edges on the side of the second end surface 14, and hence it becomes possible to stably fix the cutting insert 10.

In addition, as shown in FIGS. 2A and 2B, on the side of each of the first end surface 12 and the second end surface 14, the distance to the imaginary plane R is large in each of the connection portion between the first peripheral side surface 16 and the second peripheral side surface 18 and the connection portion between the third peripheral side surface 20 and the fourth peripheral side surface 22, and hence, as shown in, e.g., the tip view in FIG. 6, the thickness of the cutting insert 10 at the tip of the tool body 50 when the cutting insert 10 is mounted to the tool body 50 increases progressively in the outer diameter direction. Further, among the peripheral side surfaces of the cutting insert 10, the first peripheral side surface 16 facing toward the outer diameter direction and the third peripheral side surface 20 facing toward the inner diameter direction are inclined such that a distance between the first peripheral side surface 16 and the third peripheral side surface 20 decreases with approach to the first end surface 12, and increases with approach to the second end surface 14. Accordingly, it becomes possible to increase the cross-sectional area subjected to the cutting force which is applied when cutting is performed by using the main cutting edge 26 to improve the edge strength of the main cutting edge 26.

In addition, it becomes possible to reduce the thickness of the inner diameter side of the cutting insert 10, and hence it is possible to increase the thickness of the back metal of the tool body 50 connected to each of the insert mounting portion 50A and the insert mounting portion 50B to increase the stiffness of the tool body 50.

Further, it is possible to mount the cutting insert 10 to the tool body 50 by using the two inclined surfaces 12C and 12D, and hence, even when the present invention is applied to, e.g., the end mill having a small diameter (e.g., a diameter of 16 mm), it is possible to stably fix and support the cutting insert.

In addition, a dovetail structure in which the clearance 50E is provided and the wall portion 50F connected to the clearance 50E and the insert seat bottom surface form a slightly acute angle is adopted, and hence it is possible to prevent the cutting insert 10 from moving upward to achieve a high clamping force.

Note that the number of cutting inserts mounted to the end mill can be appropriately changed. However, as described in the present embodiment, by mounting two or more cutting inserts, it becomes possible to perform cutting at efficiency which is two or more times as high as efficiency in the case where cutting is performed by using one edge. In addition, it is also possible to apply the present invention to a cutting tool such as a bore type milling cutter or the like.

In addition, a land or the like may be provided in the connection portion between the end surface and the peripheral side surface.

The present invention can be variously modified without departing from the gist thereof. For example, part of components in an embodiment can be combined with another embodiment within the ordinary creative ability of a person skilled in the art.

What is claimed is:

1. A cutting insert configured to be mounted to an end portion of a body which rotates about a rotation axis, the cutting insert comprising:
   a first end surface and a second end surface which are capable of coming into contact with the body;
   a first peripheral side surface which faces an outer side in a radial direction of the rotation when the body and the second end surface come into contact with each other, and the first end surface faces toward a rotation direction;
   a second peripheral side surface which faces toward a tip direction of the body in a direction of the rotation axis;
   a third peripheral side surface which faces an inner side in the radial direction of the rotation axis;
   a fourth peripheral side surface which faces toward a base end direction of the body in the direction of the rotation axis;
   a first cutting edge which is provided in a connection portion between the first end surface and the first peripheral side surface;
   a second cutting edge which is provided in a connection portion between the first end surface and the second peripheral side surface;
   a third cutting edge which is provided in a connection portion between the second end surface and the second peripheral side surface; and
   a fourth cutting edge which is provided in a connection portion between the second end surface and the first peripheral side surface, wherein
   a through hole which passes through the first end surface and the second end surface is formed,
   the cutting insert is formed so as to be rotationally symmetrical with respect to an axis included in an imaginary plane disposed between the first end surface and the second end surface, and perpendicular to a central axis of the through hole,
   each of the first end surface and the second end surface includes a first inclined surface which is inclined from a diagonal line on the respective end surface extending from a corner portion connecting the first peripheral side surface and the second peripheral side surface where a radial distance from the central axis of the through hole becomes maximum, to a corner portion connecting the third peripheral side surface and the fourth peripheral side surface where a radial distance from the central axis of the through hole becomes maximum, toward a corner portion connecting the first peripheral side surface and the fourth peripheral side surface where a radial distance from the central axis of the through hole becomes maximum such that a distance along the central axis from the respective end surface to the imaginary plane decreases, and a second inclined surface which is inclined from the diagonal line toward a corner portion connecting the second peripheral side surface and the third peripheral side surface where a radial distance from the central axis of the through hole becomes maximum such that a distance along the central axis from the respective end surface to the imaginary plane decreases,
   the first cutting edge is inclined from the corner portion connecting the first peripheral side surface and the second peripheral side surface toward the corner portion connecting the first peripheral side surface and the fourth peripheral side surface such that a distance along the central axis from the first cutting edge to the imaginary plane decreases,
   the third cutting edge is inclined from the corner portion connecting the first peripheral side surface and the second peripheral side surface toward the corner portion connecting the second peripheral side surface and the third peripheral side surface such that a distance along the central axis from the third cutting edge to the imaginary plane decreases, and
   the first inclined surface and the second inclined surface of the second end surface are brought into contact with the body when cutting is performed by using the first cutting edge and the second cutting edge.

2. The cutting insert according to claim 1, wherein the first inclined surface and the second inclined surface of the first end surface are configured to be brought into contact with the body when the cutting is performed by using the third cutting edge and the fourth cutting edge.

3. The cutting insert according to claim 1, further comprising:
   a portion in which a distance between the second peripheral side surface and the fourth peripheral side surface decreases with approach from the first end surface to the second end surface when the portion is viewed from a direction facing the first peripheral side surface; and
a portion in which a distance between the first peripheral side surface and the third peripheral side surface increases with approach from the first end surface to the second end surface when the portion is viewed from a direction facing the second peripheral side surface.

4. The cutting insert according to claim 1, wherein
each of the first end surface and the second end surface includes a top surface which connects the first inclined surface and the second inclined surface, and does not come into contact with the body.

5. The cutting insert according to claim 1, wherein
the first inclined surface and the second inclined surface are formed so as to be rotationally symmetrical with respect to a straight line passing through the central axis of the through hole when the first inclined surface and the second inclined surface are viewed from a direction facing the first end surface, the first inclined surface is connected to the corner portion between the third peripheral side surface and the fourth peripheral side surface, and the second inclined surface is connected to the corner portion between the first peripheral side surface and the second peripheral side surface.

6. The cutting insert according to claim 1, further comprising:
a fifth cutting edge which is provided in a connection portion between the first end surface and the third peripheral side surface;
a sixth cutting edge which is provided in a connection portion between the first end surface and the fourth peripheral side surface;
a seventh cutting edge which is provided in a connection portion between the second end surface and the fourth peripheral side surface; and
an eighth cutting edge which is provided in a connection portion between the second end surface and the third peripheral side surface, wherein
the cutting insert is formed so as to be rotationally symmetrical with respect to a straight line passing through the central axis of the through hole.

7. The cutting insert according to claim 1, further comprising:
a first corner cutting edge which is connected to the first cutting edge;
a first flat cutting edge which connects the first corner cutting edge and the second cutting edge;
a second corner cutting edge which is connected to the third cutting edge; and a second flat cutting edge which connects the second corner cutting edge and the fourth cutting edge.

8. A cutting insert configured to be mounted to an end portion of a body which rotates about a rotation axis, the cutting insert comprising:
a first end surface and a second end surface which are capable of coming into contact with the body;
a first peripheral side surface which connects the first end surface and the second end surface and faces toward a first direction;
a second peripheral side surface which connects the first end surface and the second end surface and faces toward a second direction;
a third peripheral side surface which connects the first end surface and the second end surface and faces toward a third direction;
a fourth peripheral side surface which connects the first end surface and the second end surface and faces toward a fourth direction;
a first cutting edge which is provided in a connection portion between the first end surface and the first peripheral side surface;
a second cutting edge which is provided in a connection portion between the first end surface and the second peripheral side surface;
a third cutting edge which is provided in a connection portion between the second end surface and the second peripheral side surface; and
a fourth cutting edge which is provided in a connection portion between the second end surface and the first peripheral side surface, wherein
a through hole which passes through the first end surface and the second end surface is formed,
the cutting insert is formed so as to be rotationally symmetrical with respect to an axis included in an imaginary plane disposed between the first end surface and the second end surface, and perpendicular to a central axis of the through hole,
each of the first end surface and the second end surface includes a first inclined surface which is inclined from a diagonal line on the respective end surface extending from a corner portion connecting the first peripheral side surface and the second peripheral side surface where a radial distance from the central axis of the through hole becomes maximum, to a corner portion connecting the third peripheral side surface and the fourth peripheral side surface where a radial distance from the central axis of the through hole becomes maximum, toward a corner portion connecting the first peripheral side surface and the fourth peripheral side surface where a radial distance from the central axis of the through hole becomes maximum such that a distance along the central axis from the respective end surface to the imaginary plane decreases, and a second inclined surface which is inclined from the diagonal line toward a corner portion connecting the second peripheral side surface and the third peripheral side surface where a radial distance from the central axis of the through hole becomes maximum such that a distance along the central axis from the respective end surface to the imaginary plane decreases,
the first cutting edge is inclined from the corner portion connecting the first peripheral side surface and the second peripheral side surface toward the corner portion connecting the first peripheral side surface and the fourth peripheral side surface such that a distance along the central axis from the first cutting edge to the imaginary plane decreases,
the third cutting edge is inclined from the corner portion connecting the first peripheral side surface and the second peripheral side surface toward the corner portion connecting the second peripheral side surface and the third peripheral side surface such that a distance along the central axis from the third cutting edge to the imaginary plane decreases, and
the first inclined surface and the second inclined surface of the second end surface are brought into contact with the body when cutting is performed by using the first cutting edge and the second cutting edge.

9. The cutting insert according to claim 8, wherein
the first inclined surface and the second inclined surface of the first end surface are configured to be brought into contact with the body when the cutting is performed by using the third cutting edge and the fourth cutting edge.

10. A cutting tool comprising:
a body which rotates about a rotation axis; and
a cutting insert which is configured to be mounted to an end portion of the body, wherein
the cutting insert includes:
a first end surface and a second end surface which are capable of coming into contact with the body;
a first peripheral side surface which faces an outer side in a radial direction of the rotation when the body and the second end surface come into contact with each other, and the first end surface faces toward a rotation direction;
a second peripheral side surface which faces toward a tip direction of the body in a direction of the rotation axis;
a third peripheral side surface which faces an inner side in the radial direction of the rotation axis;
a fourth peripheral side surface which faces toward a base end direction of the body in the direction of the rotation axis;
a first cutting edge which is provided in a connection portion between the first end surface and the first peripheral side surface;
a second cutting edge which is provided in a connection portion between the first end surface and the second peripheral side surface;
a third cutting edge which is provided in a connection portion between the second end surface and the second peripheral side surface; and
a fourth cutting edge which is provided in a connection portion between the second end surface and the first peripheral side surface,
a through hole which passes through the first end surface and the second end surface is formed,
the cutting insert is formed so as to be rotationally symmetrical with respect to an axis included in an imaginary plane disposed between the first end surface and the second end surface, and perpendicular to a central axis of the through hole,
each of the first end surface and the second end surface includes a first inclined surface which is inclined from a diagonal line on the respective end surface extending from a corner portion connecting the first peripheral side surface and the second peripheral side surface where a radial distance from the central axis of the through hole becomes maximum, to a corner portion connecting the third peripheral side surface and the fourth peripheral side surface where a radial distance from the central axis of the through hole becomes maximum, toward a corner portion connecting the first peripheral side surface and the fourth peripheral side surface where a radial distance from the central axis of the through hole becomes maximum such that a distance along the central axis from the respective end surface to the imaginary plane decreases, and a second inclined surface which is inclined from the diagonal line toward a corner portion connecting the second peripheral side surface and the third peripheral side surface where a radial distance from the central axis of the through hole becomes maximum such that a distance along the central axis from the respective end surface to the imaginary plane decreases,
the first cutting edge is inclined from the corner portion between the first peripheral side surface and the second peripheral side surface toward the corner portion between the first peripheral side surface and the fourth peripheral side surface such that a distance along the central axis from the first cutting edge to the imaginary plane decreases,
the third cutting edge is inclined from the corner portion between the first peripheral side surface and the second peripheral side surface toward the corner portion between the second peripheral side surface and the third peripheral side surface such that a distance along the central axis from the third cutting edge to the imaginary plane decreases, and
the first inclined surface and the second inclined surface of the second end surface are brought into contact with the body when cutting is performed by using the first cutting edge and the second cutting edge.

11. The cutting tool according to claim 10, wherein
the first inclined surface and the second inclined surface of the first end surface are configured to be brought into contact with the body when the cutting is performed by using the third cutting edge and the fourth cutting edge.

* * * * *